United States Patent [19]

Swanson et al.

[11] 4,205,724

[45] Jun. 3, 1980

[54] WELL TREATING COMPOSITIONS

[75] Inventors: Billy L. Swanson; Louis E. Roper, both of Bartlesville, Okla.

[73] Assignee: Phillips Petroleum Company, Bartlesville, Okla.

[21] Appl. No.: 908,607

[22] Filed: May 23, 1978

[51] Int. Cl.$^2$ .............................................. E21B 43/27
[52] U.S. Cl. ................................... 166/302; 166/307; 252/8.55 C; 252/316
[58] Field of Search ..................... 252/8.55 C, 8.55 R, 252/316; 166/282, 307, 302

[56] References Cited

U.S. PATENT DOCUMENTS

| | | | |
|---|---|---|---|
| 3,762,476 | 10/1973 | Gall | 166/294 |
| 3,782,467 | 1/1974 | Hessert | 166/261 |
| 3,845,822 | 11/1974 | Clampitt et al. | 166/281 |
| 3,888,312 | 6/1975 | Tiner et al. | 166/308 |
| 3,923,666 | 12/1975 | Dill | 252/8.55 |
| 4,040,484 | 8/1977 | Hessert | 166/295 X |
| 4,055,502 | 10/1977 | Swanson | 252/316 X |
| 4,068,719 | 1/1978 | Clampitt et al. | 166/307 X |
| 4,068,720 | 1/1978 | Hessert et al. | 252/8.55 X |

Primary Examiner—Herbert B. Guynn

[57] ABSTRACT

Gelled acidic compositions suitable for matrix acidizing or fracture-acidizing of subterranean formations are provided comprising water, a water-dispersible polyalkoxylated cellulose ether, or acrylamide-derived cationic polymeric viscosifier, an acid, and a water-soluble iodine-containing redox couple system comprising a polyvalent nonmetal-containing compound and a reducing agent.

13 Claims, No Drawings

WELL TREATING COMPOSITIONS

This invention relates to gelled acidic compositions and to acid treating or acidizing of subterranean formations. In accordance with another aspect, this invention relates to gelled acidic compositions comprising thickened aqueous acid solutions prepared from a water-dispersible polymeric viscosifier, an acid, and an iodine-containing redox couple system. In accordance with another aspect, this invention relates to gelled acidic compositions suitable for either matrix acidizing or fracture-acidizing of subterranean formations to enhance the efficiency of oil recovery. In accordance with a further aspect, this invention relates to gelled acidic compositions exhibiting desirable properties comprising water, a water-dispersible polymeric material such as hydroxyethyl cellulose, or a copolymer of acrylamide, an acid such as aqueous HCl, and a water-soluble iodine-containing redox couple system comprising a polyvalent nonmetal-containing compound and a reducing agent.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid such as aqueous HCl into the well under sufficient pressure to force the acid out into the formation to react with the acid-soluble components of the formation. The technique is not limited to formations of high acid solubility such as limestone, but is also applicable to other types of formations such as a sandstone containing streaks or striations of acid-soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

The term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to 5 or more, in a small volume matrix acidizing operation, and several hundred feet, e.g., up to 500 or more, in a large volume fracture-acidizing operation.

Poor penetration can also be caused and/or aggravated by fluid loss to the more porous zones of the formation where low permeability is not a problem. Poor penetration can also be caused and/or aggravated by leak-off at the fracture faces in combination fracturing-acidizing operations. Either said fluid loss or said leak-off can frequently worsen the situation by leaving the tight (low permeability) zones of the formation unchanged and merely further open up the already high permeability zones.

One solution which has been proposed for the above-discussed problem is to incorporate various polymeric thickening or viscosifying agents into the acid solution. Said agents serve to thicken the acid solution and thus increase the viscosity thereof. It has been reported that so-thickened acid solutions have reduced fluid loss properties. For example, see U.S. Pat. No. 3,415,319, issued Dec. 10, 1968, in the name of B. L. Gibson, and U.S. Pat. No. 3,434,971, issued Mar. 25, 1969, in the name of B. L. Atkins. It has also been reported that the reaction rate of said so-thickened acid solutions with the acid-soluble portions of the formation is lessened or retarded. See, for example, U.S. Pat. No. 3,749,169, issued July 31, 1973, in the name of J. F. Tate; U.S. Pat. No. 3,236,305, issued Feb. 22, 1966, in the name of C. F. Parks; and U.S. Pat. No. 3,252,904, issued May 24, 1966, in the name of N. F. Carpenter.

HIgher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation, or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above-discussed problems. The present invention provides improved methods for acidizing, or fracture-acidizing, subterranean formations, and new gelled acidic compositions for use in said methods.

Accordingly, an object of this invention is to provide gelled acidic compositions that are stable.

Another object of this invention is to provide gelled acidic compositions suitable for matrix acidizing.

A further object of this invention is to provide gelled acidic compositions suitable for fracture-acidizing of subterranean formations.

Other objects, aspects, and the several advantages of this invention will be apparent from a study of the disclosure and the appended claims.

In accordance with the invention, gelled acidic compositions are provided comprising water, a water-dispersible polymeric viscosifier, an acid, and a water-soluble iodine-containing redox couple.

More specifically, in accordance with the invention, gelled acidic compositions are provided comprising water, a water-dispersible polymeric viscosifier selected from polyoxyalkylated cellulose ethers and acrylamide-derived cationic polymers, an acid such as aqueous HCl, and an iodine-containing redox couple comprising a polyvalent nonmetal-containing compound and a reducing agent.

Further, in accordance with the invention, there is provided a method for acid treating a porous subterranean formation susceptible to attack by an acid and penetrated by a well bore which comprises injecting into the formation a gelled acidic composition comprising water, a water-dispersible polymeric viscosifier as defined herein, an acid, and a water-soluble iodine-containing redox couple as defined herein and maintaining the gelled acidic composition in the formation for a period of time sufficient for the acid in the composition to react significantly with the acid-soluble components in the formation and stimulate the production of fluids therefrom.

Still further, in accordance with the invention, a method for preparing said gelled acidic compositions is provided comprising forming an aqueous solution of a water-dispersible polymeric viscosifier selected from polyoxyalkylated cellulose ethers and acrylamide-derived cationic polymers and an iodine-containing redox couple, and adding sufficient acid to the resulting solution to cause gelation and form a strongly acidic gelled composition.

Herein and in the claims, unless otherwise specified, the term "polymer" is employed generically to include both homopolymers and copolymers, and the term "water-dispersible polymers" is employed generically to include those polymers which are truly water-soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Polymers suitable for use in the present invention are selected from cationic polyacrylamide copolymers and polyalkoxylated cellulose ethers.

The best known polyalkoxylated cellulose ethers which are useful in the present invention are CMHEC (carboxymethyl hydroxyethyl cellulose) and HEC (hydroxyethyl cellulose). These compositions are best described in terms of "D.S." (degree of substitution) and "M.S." (molar substitution based on hydroxyethyl groups).

The purpose of the following two paragraphs is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

For the mixed ethers involved herein (i.e., CMHEC), the first value given is the carboxymethyl D.S. and the second value given is the hydroxyethyl M.S. Two types of CMHEC which are commercially available and which have been for several years are CMHEC of 0.3 carboxymethyl D.S. and 0.7 hydroxyethyl M.S., as well as CMHEC of 0.4 carboxymethyl D.S. and 0.3 hydroxyethyl M.S. These polymers are referred to as CMHEC 37 and CMHEC 43, respectively. CMHEC 420 has a carboxymethyl D.S. of 0.4 and a hydroxyethyl M.S. of 2.

In the present invention, the M.S. for polyethyoxylated cellulose ethers such as HEC is in the broad range of 0.3 to 5, preferably 2 to 3. Thus, a hydroxyethyl cellulose with a M.S. of 3 is more suitable than a hydroxyethyl cellulose ether with M.S. equal to 1.5.

A presently preferred group of copolymers for use in the practice of the invention comprise the copolymers of acrylamide or methacrylamide with a monomer of the formula:

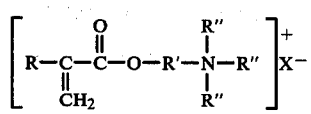

wherein R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; each R" is an alkyl radical containing from 1 to 6 carbon atoms, preferably from 1 to 4 carbon atoms; X is any suitable anion such as methylsulfate, ethylsulfate, chloride, bromide, acetate, nitrate, and the like; and wherein the number of repeating units from said formula (C) monomer is within the range of from 1 to 90, preferably 5 to 70, more preferably 10 to 60, mol percent.

Monomers of the above formula (C) and methods for their preparation are known in the art. For example, see U.S. Pat. No. 3,573,263, issued Mar. 30, 1971, in the name of E. A. Gill. In the above formula (C), when R is H, R' is —CH$_2$—CH$_2$—, one R" is a methyl radical, and the other two R" are each an ethyl radical, and X is a CH$_3$SO$_4^-$ anion, the monomer is the commercially available material (acryloyloxyethyl)diethylmethylammonium methylsulfate, which can be referred to as DEMMS. In the above formula (C), when R is a methyl radical, R' is —CH$_2$CH$_2$—, each R" is a methyl radical, and X is a CH$_3$SO$_4^-$ anion, the monomer is the commercially available material (methacryloyloxyethyl)-trimethylammonium methylsulfate, sometimes referred to as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten (a trademark) 210, a 90:10 acrylamide/MTMMS copolymer; Hercules Reten (a trademark) 220, an 80:20 acrylamide/MTMMS copolymer; Hercules Reten (a trademark) 245, a 55:45 acrylamide/MTMMS copolymer; and Hercules Reten (a trademark) 260, a 40:60 acrylamide/MTMMS copolymer. The type of copolymers wherein the number of units from said formula (C) monomer is within the range of from 10 to 60 mol percent thus comprise another more preferred group of copolymers for use in the practice of the invention. Said copolymers can be represented by the formula:

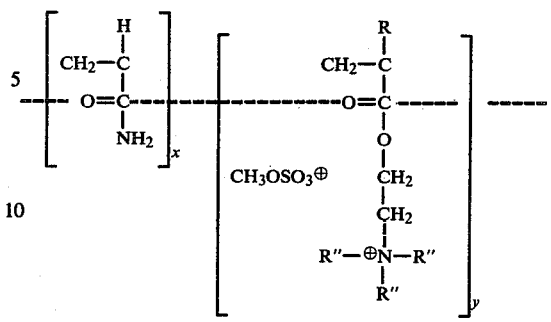

wherein R is either hydrogen or a methyl radical; each R" is a methyl radical, or one R" is a methyl radical and the other two R" are each an ethyl radical; and x and y represent the mol percent of said units as set forth above, it being understood that the various copolymers do not necessarily consist of alternating units as depicted above in (D). It is also within the scope of the invention for the acrylamide units in the above formula (D) to be methacrylamide units, and for a portion of the —NH$_2$ groups in said units to be hydrolyzed.

Thus, it is also within the scope of the invention for the acrylamide units in the above formula (D) to be derivatives of either acrylamide or methacrylamide wherein the —NH$_2$ groups can be —NH$_2$ or —OM as defined below. Thus, copolymers of said derivatives with the above monomer (C) can be represented by the formula:

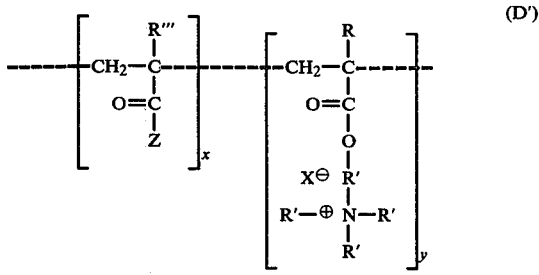

wherein R, R', R", and X are as defined above in formula (C); R'" is hydrogen or a methyl radical; in the above Type I monomer units, Z is either —NH$_2$ or —OM wherein M is hydrogen, ammonium, or an alkali metal, with said M preferably being hydrogen, sodium, or potassium.

All the polymers useful in the practice of the invention are characterized by high molecular weight. The molecular weight is not critical so long as the polymer has the above-described water-dispersible properties and meets the above-stated compatibility requirements. It is preferred that the acrylamide derived polymers have a molecular weight of at least 500,000, more preferably at least about 2,000,000, whereas the suitable cellulose ether polymers should have a molecular weight of at least 200,000. The upper limit of molecular weight is unimportant so long as the polymer is water-dispersible, and the gelled acidic composition therefrom can be pumped. Thus, it is within the scope of the invention to use polymers having molecular weights as high as 20,000,000 or higher, and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts of the order of 25 to 100 parts per million by weight (0.0025 to 0.01 weight percent) have been found to significantly thicken water. Generally speaking, amounts of the above-described polymers in the range of from 0.1 to 3, preferably from 0.5 to about 2, weight percent, based on the total weight of the composition, can be used in preparing gelled acidic compositions for use in the practice of the invention.

If the polymer used is one of the above-discussed MTMMS or DEMMS copolymers, the polymer concentration will preferably be in the range of from 0.75 to about 2 weight percent based on the total weight of the composition. In general, with the proper amounts of acid and iodine-containing material, the amount of polymer used will determine the consistency of the gel obtained. Small amounts of polymer will usually produce thicker, more viscous, somewhat elastic gels. There is really no fixed upper limit on the amount of polymer which can be used as long as the gelled acidic composition can be pumped into the formation.

Acids useful in the practice of the invention include any acid meeting the above-stated compatibility requirements and which is effective in increasing the flow of fluids, e.g., hydrocarbons, through the formation and into the well. Thus, under proper conditions of use, examples of such acids can include inorganic acids such as hydrochloric acid, phosphoric acid, nitric acid, and sulfuric acid; $C_1$-$C_4$ organic acids such as formic acid, acetic acid, propionic acid, butyric acid, and mixtures thereof, and combinations of inorganic and organic acids. The nonoxidizing acids are preferred. The concentration or strength of the acid can vary depending upon the type of acid, the type of formation being treated, the above-stated compatibility requirements, and the results desired in the particular treating operation. Generally speaking, the concentration can vary from 0.5 to about 15 weight percent, depending upon the type of acid and polymer viscosifier, with concentrations within the range of 1 to 5 weight percent usually preferred, based upon the total weight of the gelled acidic composition. When an inorganic acid such as hydrochloric acid is used, it is presently preferred to use an amount which is sufficient to provide an amount of HCl within the range of from 2 to about 4, more preferably about 3 weight percent, based on the total weight of the gelled acidic composition. Amounts within the range of about 1 to about 10 weight percent will frequently be practical amounts to use. The acids used in the practice of the invention can contain any of the known corrosion inhibitors, deemulsifying agents, sequestering agents, surfactants, friction reducers, etc., known in the art, and which meet the above-stated compatibility requirements.

Suitable water-soluble iodine-containing redox couple systems that can be used include those containing iodine in two different valent states such as a mixture of water-soluble metal or ammonium iodide and iodate, e.g., KI and $KIO_3$. It is also contemplated that the iodine-containing materials useful in the present invention can be selected from compounds containing polyhalide anions such as tetra-n-butylammonium triiodide and the like prepared as described in Inorg. Syn., 5, 166. Other water-soluble iodine-containing redox couples envisioned as suitable for use in the present invention include $NO_3^-/I^-$, $O_2^=/I^-$, and the like.

The parameters suitable for use in the present invention are summarized below:

|  | Broad | Preferred |
| --- | --- | --- |
| Wt. Ratio of Reductant:Oxidant in the Redox Couple, e.g., $I^-$ : $IO_3^-$ | 2:1 to 15:1 | 4:1 to 8:1 |
| Wt. Percent Acid in final Composition, e.g., HCl | 0.5 to 15 wt. % | 2 to 5 wt. % |
| Wt. % Polymer in final Composition | 0.1 to 3 wt. % | 0.5 to 2 wt. % |
| W. ratio of Polymer: total redox couple | 3.75:1 to 0.51 | 2.5:1 to 1.5:1 |

Propping agents can be included in the gelled acidic compositions of the invention if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used they should be made of materials which are not severely attacked by acid used during the time they are exposed to said acid.

Any suitable method can be employed for preparing the gelled acidic compositions of the invention. Thus, any suitable mixing technique or order of addition of the components of said composition to each other can be employed which will provide a composition having sufficient stability to degeneration by the heat of the formation (in which the composition is to be used) to permit good penetration of the composition into, and significant etching of, said formation. However, it is ordinarily preferred to first dissolve or disperse the iodine-containing material and polymer in water before contacting the polymer solution with acid, e.g., the addition of KI and $KIO_3$ to the aqueous polymer solution can be followed by the addition of aqueous HCl. It is within the scope of the invention to moisten or slurry the polymer with a small amount, e.g, about 1 to about 6 weight percent, based on the weight of the polymer, of a small amount of a low molecular weight alcohol, e.g., $C_1$ to $C_3$ alcohols, as a dispersion aid prior to dispersing the polymer in water. It is preferred that there be no undue delay between completing the preparation of the gelled acidic composition and its introduction into contact with the formation. The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "as on the fly." For example, a solution of the iodine-containing redox couple and polymer in water can be prepared in a tank adjacent the well head. Pumping of this solution through a conduit to the well head can then be started. Then, a few feet downstream from the tank a suitable connection can be provided for introducing the acid into said conduit, preferably as an aqueous solution. As will be understood by those skilled in the art, the rate of introduction of said components into said conduit will depend upon the pumping rate of the polymer solution through said conduit. Suitable order of addition can be employed in said "on the fly" technique. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can by any suitable volume sufficient to significantly decrease the temperature of the formation being treated, and can vary depending upon the characteristics of the formation. For example, amounts up to 20,000 gallons or more can be used to obtain a temperature decrease in the order of 100° to 250° F.

The following examples will serve to further illustrate the invention, but should not be considered as unduly limiting on the invention. In carrying out the examples, the following general procedure was employed.

A 0.5 weight percent stock solution of polymer or copolymer was prepared at ambient temperature in deionized water. A portion of this stock solution was admixed with an iodine-containing redox couple and then acid was added and the viscosities measured on a modified Stormer viscometer.

EXAMPLE I

Inventive gel compositions comprising hydroxyethylcellulose (HEC, e.g., Natrosol 300 HHW), aqueous HCl, KI, and KIO$_3$ were prepared in accordance with the general procedure, and the properties of these systems are shown in Table I.

TABLE 1

| | Redox Couple (ppm) | | Gelation of Hydroxyethyl Cellulose* (HEC) with KI/KIO$_3$ in 3% HCl** | | | | |
|---|---|---|---|---|---|---|---|
| | | | Wt. Ratio | Total ppm | Viscosity (cp) | | (ppm Polymer) |
| Run No. | KI | KIO$_3$ | KI/KIO$_3$ | Redox Couple | Initial | After 1 Hr. | (Total ppm Redox Couple) Ratio |
| Control | 0.0 | 0.0 | NA$^a$ | NA$^a$ | 125 | 125 | NA$^a$ |
| 1 | 960 | 240 | 4:1 | 1200 | 110 | 110 | 4.2 |
| 2 | 1200 | 300 | 4:1 | 1500 | 125 | 120 | 3.3 |
| 3 | 1600 | 400 | 4:1 | 2000 | 325 | 380 | 2.5 |
| 4 | 1200 | 240 | 5:1 | 1440 | 240 | 260 | 3.5 |
| 5 | 1600 | 320 | 5:1 | 1920 | 1000 | 610 | 2.6 |
| 6 | 1440 | 240 | 6:1 | 1680 | 180 | 220 | 3.0 |
| 7 | 1800 | 300 | 6:1 | 2100 | 680 | 600 | 2.4 |
| 8 | 2400 | 400 | 6:1 | 2800 | 1550 | 600 | 1.8 |
| 9 | 1920 | 240 | 8:1 | 2160 | 160 | 210 | 2.3 |
| 10 | 2400 | 300 | 8:1 | 2700 | 175 | 180 | 1.9 |
| 11 | 3200 | 400 | 8:1 | 3600 | 950 | 315 | 1.4 |
| 12 | 2400 | 240 | 10:1 | 2640 | 175 | 210 | 1.9 |

*232 ml portions of ~5000 ppm aqueous HEC solution were used in each run; the order of reagent addition was KI, KIO$_3$, and HCl; viscosities were measured with a modified Stormer Viscometer.
**18 ml of concentrated HCl was added to each test sample.
$^a$NA represents not applicable.

The above viscosity results indicate that the gelation of the hydroxyethyl cellulose is effected by the iodine-containing redox couple (KI/KIO$_3$) in the presence of 3 weight precent HCl. Attention is called to the fact that a 4:1 ratio of iodide to iodate (see run 3) appears to be operable at iodide and iodate levels, respectively, of 1600 ppm and 400 ppm (total ppm for redox couple=2000) for the 5000 ppm solution of polymer. The 4:1 level (see runs 1 and 2) appeared to be approximately the same in viscosity as the control run. Apparently it is necessary to have a total ppm value of about 2000 for the redox couple components at a 4:1 reductant:oxidant ratio to gel a 5000 ppm polymer solution. In general, the higher viscosities were observed if the ppm polymer/ppm total redox couple ratio was in the range of 1.4 to 3.5. The only obvious exception is shown in run 2 which apparently was inoperable with said ratio equal to 3.3.

EXAMPLE II

The viscosity values in Table II indicate the effectiveness of the inventive systems in gelling acidic solutions of cationic polyacrylamide copolymers.

TABLE II

| | Gelatin of Cationic Polyacrylamides* with KI/KIO$_3$ in 3% HCl | | | | | |
|---|---|---|---|---|---|---|
| Run | Redox Couple (ppm) | | Weight Ratio | Redox Couple | Viscosity | ppm Polymer |
| No. | KI | KIO$_3$ | KI/KIO$_3$ | Total ppm | Cp | (Total ppm Redox Couple) Ratio |
| Control-A | 0.0 | 0.0 | NA$^a$ | NA$^a$ | 8 | NA$^a$ |
| 13 | 4000 | 800 | 5:1 | 4800 | 33 | 1.0 |
| 14 | 2000 | 300 | 6.7:1 | 2300 | 15 | 2.2 |
| 15 | 4000 | 500 | 8:1 | 4500 | 33 | 1.1 |
| 16 | 4000 | 400 | 10:1 | 4400 | 16 | 1.1 |
| Control-B | 0.0 | 0.0 | NA$^a$ | NA$^a$ | 13 | NA$^a$ |
| 17 | 1000 | 400 | 2.5:1 | 1400 | 30 | 3.6 |
| 18 | 2000 | 400 | 5:1 | 2400 | 335 | 2.1 |
| 19 | 2000 | 200 | 10:1 | 2200 | 225 | 2.3 |
| 20 | 4000 | 400 | 10:1 | 4400 | 220 | 1.1 |
| Control-C | 0.0 | 0.0 | NA$^a$ | NA$^a$ | 2.9 | NA$^a$ |

TABLE II-continued

| | Gelatin of Cationic Polyacrylamides* with KI/KIO$_3$ in 3% HCl | | | | | |
|---|---|---|---|---|---|---|
| Run No. | Redox Couple (ppm) KI | KIO$_3$ | Weight Ratio KI/KIO$_3$ | Redox Couple Total ppm | Viscosity Cp | ppm Polymer (Total ppm Redox Couple) Ratio |
| 21 | 1200 | 300 | 4:1 | 1500 | 3.6 | 3.3 |
| 22 | 2000 | 400 | 5:1 | 2400 | 44 | 2.1 |
| 23 | 3000 | 600 | 5:1 | 3600 | 14 | 1.4 |

*The cationic polyacrylamides used included Reten 220 (see Control Run A and inventive Runs 13–16) wherein the cationic portion is 20 mol percent MTMMS described hereinabove; Reten 245 (see Control Run B and inventive Runs 17–20) wherein the cationic portion is 45 mol percent MTMMS described hereinabove; Reten 300 (Control Run C and inventive Runs 21–23) is a cationic homopolymer.
$^a$NA represents not applicable.

The control run A and inventive runs 13–16 illustrate the operability of the cationic polyacrylamide Reten 220 (described hereinabove) in the present invention. Apparently the ratio ppm polymer/total ppm redox couple is advantageously established at about 1:1.

EXAMPLE III

The present example illustrates the advantage of using a hydroxyethyl cellulose of M.S. equal to 3 over using a hydroxyethyl cellulose of M.S. equal to 1.5.

TABLE III

| | Gelatin of Hydroxyethyl Cellulose Polymers* with Different M.S. Values | | | | | |
|---|---|---|---|---|---|---|
| Run No. | Redox Couple (ppm) KI | KIO$_3$ | Weight Ratio KI/KIO$_3$ | Redox Couple Total ppm | Viscosity Cp | ppm Polymer (Total ppm Redox Couple) Ratio |
| Control-A | 0.0 | 0.0 | NA$^a$ | NA$^a$ | 88 | NA$^a$ |
| 24 | 2000 | 400 | 5:1 | 2400 | 1010 | 2.1 |
| 25 | 3000 | 400 | 7.5:1 | 3400 | 1870 | 1.5 |
| 26 | 2000 | 200 | 10:1 | 2200 | 320 | 2.3 |
| Control-B | 0.0 | 0.0 | NA$^a$ | NA$^a$ | 103 | NA$^a$ |
| 27 | 2000 | 400 | 5:1 | 2400 | 210 | 2.1 |
| 28 | 4000 | 800 | 5:1 | 4800 | 310 | 1.0 |
| 29 | 1200 | 240 | 5:1 | 1440 | 115 | 3.5 |
| 30$^b$ | 2000 | 400 | 5:1 | 2400 | 155 | 2.1 |

*Control-A run involved the use of hydroxyethyl cellulose with M.S. of 3.0 (Natrosol 300 HHW), and Control-B run involved the use of hydroxyethyl cellulose with M.S. of 1.5 (Natrosol 150 HHW).
$^a$NA represents not applicable.
$^b$The order of addition was KIO$_3$, and HCl, and KI; in all the other runs in this table the order of addition was KI, KIO$_3$, and HCl.

The inventive gelling system comprising the Reten 245 cationic polyacrylamide, KI, KIO$_3$, and HCl (see control B and inventive runs 17–20) seems to be more efficient than either the Reten 220 system or the Reten 300 system as evidenced by the higher viscosity values at lower total ppm for the redox couple. In inventive runs 19 and 20, the doubling of the total ppm of redox couple used appeared to have no effect on the observed viscosity.

In control run C and runs 21–23, a total ppm equal to 1500 for the 4:1 weight ratio of KI/KIO$_3$ appears to be of marginal operability. Some "overtreatment" effect might account for the lower viscosity in run 23 with the cationic homopolymer although no such similar effect was observed with Reten 245 in run 20 with even a higher ppm for KI (4000 ppm).

The viscosity for the 3 M.S. hydroxyethyl cellulose Run 24 showed a much higher viscosity (1010 centipoise) than a similar system such as Run 27 using a 1.5 M.S. hydroxyethyl cellulose polymer (viscosity 210).

The change in the order of addition is regard to Runs 27 and 30 indicated a slight preference for the order KI, KIO$_3$, HCl (Run 27, viscosity 210 cp) over the order KIO$_3$, HCl, KI (Run 30, viscosity 155).

EXAMPLE IV

A series of samples were run to study the effect, if any, of using a different order of addition to prepare the inventive gels (see Table IV below).

TABLE IV

| | Gelation of Carboxymethylhydroxyethyl Cellulose* (CMHEC) with KI/KIO$_3$** in 3% HCl*** | | | | |
|---|---|---|---|---|---|
| Run No. | Order of Addition | Viscosity (Cp) Initial | After 1 Hr. | Total ppm Redox Couple | ppm Polymer (Total ppm Redox Couple) |
| Control | KI, KIO$_3$, HCl (ROA)$^a$ | 1180 | 265 | 2300 | 2.2 |
| 31 | KIO$_3$, KI, HCl (ORA)$^a$ | 1120 | 210 | 2300 | 2.2 |
| 32 | HCl, KIO$_3$, KI (AOR)$^a$ | 990 | 280 | 2300 | 2.2 |
| 33 | HCl, KI, KIO$_3$(ARO)$^a$ | 910 | 252 | 2300 | 2.2 |
| 34 | KI, HCl, KIO$_3$ (RAO)$^a$ | 865 | 285 | 2300 | 2.2 |
| 35 | KIO$_3$, HCl, KI (OAR)$^a$ | 960 | 190 | 2300 | 2.2 |

*CMHEC polymer was used as a 5000 ppm aqueous solution in each run.
**The weight ratio of KI/KIO$_3$ was 6.7:1 in each run.
***The appropriate amount of concentrated HCl was added to give a concentration of 3 weight percent in the final composition of each run.
$^a$"R" repesents "reductant" (KI); "O" represents "oxidant" (KIO$_3$); "A" repesents "acid" (HCl).

The above viscosity values indicate that the various orders of addition for the oxidant (KIO$_3$), reductant (KI), and acid (HCl) are essentially equivalent for the gelling system under consideration.

EXAMPLE V

The results shown in Table V below illustrate that higher viscosities are obtained in gelled systems containing hydroxyethyl cellulose (HEC) compared to similar systems containing carboxymethylhydroxyethyl cellulose (CMHEC). The HEC system was used in Control-A and inventive Runs 36–38; the CMHEC system was used in Control-B and inventive Runs 39–41.

TABLE V

Comparative Viscosity Data for Gelled Systems Comprising HEC* or CHMEC** and a $KI/KIO_3$ Redox Couple in 3% HCl

| Run No. | Redox Couple (ppm) KI | $KIO_3$ | Weight Ratio $KI/KIO_3$ | Redox Couple Total ppm | Viscosity (Cp) | ppm Polymer (Total ppm Redox Couple) |
|---|---|---|---|---|---|---|
| Control-A* | $NA^a$ | | $NA^a$ | $NA^a$ | 165 | $NA^a$ |
| 36 | 2000 | 500 | 4:1 | 2500 | 675 | 2.0 |
| 37 | 4000 | 500 | 8:1 | 4500 | 1175 | 1.1 |
| 38 | 2000 | 200 | 10:1 | 2200 | 200 | 2.3 |
| ontrol-B** | $NA^a$ | $NA^a$ | $NA^a$ | 92 | $NA^a$ | |
| 39 | 2000 | 500 | 4:1 | 2500 | 96 | 2.0 |
| 40 | 4000 | 500 | 8:1 | 4500 | 500 | 1.1 |
| 41 | 2000 | 200 | 10:1 | 2200 | 123 | 2.3 |

*HEC represents hydroxyethyl cellulose with a M.S. equal to 2.5 (Natrosol 250 HHW).
**CMHEC represents carboxymethylhydroxyethyl cellulose with a carboxymethyl D.S. of 0.4 and a hydroxyethyl M.S. of 2.0 (CMHEC 420). This CMHEC has an M.S. of 2.46 by actual analysis.
$^a$NA represents not applicable.

Natrosol 250 HHW and CHMEC 420 polymer contain the same amount of hydroxyethyl substitution. The lower viscosities in the cellulose polymer gels are perhaps caused by hindrance from the carboxymethyl groups. Some carboxymethyl groups can be reacted on the hydroxyethyl side chains.

EXAMPLE VI

Compositions comprising hydroxyethyl cellulose (HEC, e.g., Natrosol 250 HHW), $Na_2SO_3$, $KIO_3$, and aqueous HCl were prepared in accordance with the general procedure, and the measured viscosities are shown in Table VI below.

TABLE VI

| Run No. | Redox Couple (ppm) $Na_2SO_3$ | $KIO_3$ | Weight Ratio $Na_2SO_3/KIO_3$ | Total ppm Redox Couple | Viscosity (Cp) | (ppm Polymer) (Total ppm Redox Couple) |
|---|---|---|---|---|---|---|
| Control | $NA^a$ | $NA^a$ | $NA^a$ | $NA^a$ | 720 | $NA^a$ |
| 42 | 10,000 | 2500 | 4:1 | 12,500 | 665 | 0.8 |
| 43 | 3,750 | 2500 | 1.5:1 | 6,250 | 715 | 1.6 |
| 44 | 7,500 | 5000 | 1.5:1 | 12,500 | 520 | 0.8 |

*HEC used in these runs had an M.S. equal to 2.5 (Natrosol 250 HHW).
$^a$NA represents not applicable.

The results shown in Table VI indicate that the compositions of Runs 42–44 gave viscosities no greater and generally lower than the viscosity of the control run using a 10,000 ppm solution of Natrosol 250 HHW. The 10,000 ppm solution of Natrosol 250 HHW was used in Runs 42–44. Unsuccessful Runs 43 and 44 could have been caused by the 1.5:1 ratio of reductant to oxidant which is outside the broad range disclosed hereinabove. Run 42 is also inoperable and suggests that perhaps somewhat different parameters may be required for certain reductants such as $Na_2SO_3$.

We claim:

1. An acidic gelled composition suitable for matrix acidizing or fracture-acidizing of a porous subterranean formation susceptible to attack by an acid formed upon admixing:
   (a) water,
   (b) a water-thickening amount of a water-dispersible polymeric viscosifier selected from the group consisting of polyalkoxylated cellulose ethers and acrylamide-derived cationic polymers,
   (c) a small, but effective amount of a water-soluble iodine-containing redox couple system comprising,
      (1) an oxidant selected from the group consisting of water-soluble metal iodates and ammonium iodate and
      (2) a reductant selected from the group consisting of water-soluble metal iodides and ammonium iodide, the weight ratio of reductant (2) to oxidant (1) being in the range 2:1 to 15:1, and the weight ratio of polymeric viscosifier to redox couple system being in the range of about 3.75:1 to 0.5:1 and
   (d) a small, but effective amount of an acid sufficient to produce an acidic gelled composition, said acid being effective for dissolving at least a portion of the formation; said polymeric viscosifier, said iodine-containing redox couple, and said acid being used in amounts sufficiently compatible with each other in an aqueous dispersion thereof to permit gelation of said acidic gelled composition.

2. A composition according to claim 1 wherein the amount of (b) is in the range of about 0.1 to 3 weight percent, the amount of (d) in the range of about 0.5 to 15 weight percent.

3. A composition according to claim 1 wherein (b) is hydroxyethyl cellulose (HEC), (c) is KI and $KIO_3$, and (d) is HCl.

4. A composition according to claim 1 wherein (b) is a copolymer of acrylamide and (methacryloyloxyethylene) trimethylammonium methyl sulfate, (c) is KI and $KIO_3$, and (d) is HCl.

5. A composition according to claim 3 wherein (b) has an M.S. value in the range of 0.3 to 5.

6. A process for matrix acidizing a porous subterranean formation susceptible to attack by an acid and penetrated by at least one well bore which comprises:

(a) injecting into said formation an acidic gelled composition according to claim 1 in an amount and at a pressure insufficient to create cracks or fractures in the formation, (b) allowing the acidic gelled composition to remain in the formation for a period of time sufficient to etch the formation passageways contacted by said composition, thus stimulating the subsequent production of fluids therefrom, (c) removing the acidic gelled composition from said formation, and (d) producing fluids from the thus-treated formation.

7. A process according to claim 6 wherein the formation is precooled prior to injection of the gelled composition by contacting with a cooling medium.

8. A process according to claim 7 wherein the formation is cooled by contacting with water under conditions that the formation temperature is reduced about 100° to about 250° F.

9. A process for the fracture acidizing of a porous subterranean formation susceptible to attack by an acid and penetrated by at least one well bore which comprises:

(a) injecting into said formation an acidic gelled composition according to claim 1 at a rate and pressure sufficient to cause fracturing of said formation, (b) allowing said acidic gelled composition to remain in the formation for a period of time sufficient to etch the formation passageways contacted by said composition, thus stimulating subsequent production of fluids therefrom, (c) removing the acidic gelled composition from said formation, and (d) producing fluids from the thus-treated formation.

10. A process according to claim 9 wherein propping agents are added to said gelled composition prior to introduction into a subterranean formation.

11. A process according to claim 9 wherein the formation is precooled prior to injection of the gelled composition by contacting with a cooling medium.

12. A method for producing acidic gelled compositions which comprises:

(a) forming an aqueous solution of a water-dispersible polyalkoxylated cellulose ether or acrylamide-derived cationic polymeric viscosifier and an iodine-containing redox couple system comprising (1) an oxidant selected from the group consisting of water-soluble metal iodates and ammonium iodate and (2) a reductant selected from the group consisting of water-soluble metal iodides and ammonium iodide, the weight ratio of reductant (2) to oxidant (1) being in the range 2:1 to 15:1, and the weight ratio of polymeric viscosifier to redox couple system being in the range of about 3.75:1 to 0.5:1 and (b) adding an acid which is effective for dissolving at least a portion of a subterranean formation to the resulting thickened solution in an amount sufficient to cause gelation and form an acidic gelled composition.

13. A method according to claim 12 wherein the amount of acid added is in the range of about 0.5 to 15 weight percent of the final composition.

* * * * *